(12) United States Patent
Watanabe et al.

(10) Patent No.: US 10,374,453 B2
(45) Date of Patent: Aug. 6, 2019

(54) UNINTERRUPTIBLE POWER SUPPLY AND CONTROL METHOD THERE OF (71) Applicant: FUJI ELECTRIC CO., LTD., Kawasaki-shi, Kanagawa (JP)

(72) Inventors: Shigeru Watanabe, Hino (JP); Kazuhiro Iwai, Tsuchiura (JP); Asuka Ohno, Suzuka (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 35 days.

(21) Appl. No.: 15/638,438

(22) Filed: Jun. 30, 2017

(65) Prior Publication Data
US 2017/0302104 A1 Oct. 19, 2017

Related U.S. Application Data (63) Continuation of application No. PCT/JP2016/061272, filed on Apr. 6, 2016.

(30) Foreign Application Priority Data

May 25, 2015 (JP) ................................ 2015-105912

(51) Int. Cl.
*H04L 12/10* (2006.01)
*H02J 3/36* (2006.01)
(Continued)

(52) U.S. Cl.
CPC ........ *H02J 9/06* (2013.01); *H02J 7/34* (2013.01); *H02J 9/061* (2013.01); *H04B 1/40* (2013.01); *H04L 1/0001* (2013.01); *H04L 27/20* (2013.01)

(58) Field of Classification Search
CPC ........ H02J 7/34; H02J 9/06; H02J 9/061; H04L 1/0001; H04L 27/20; H04B 1/40
See application file for complete search history.

(56) References Cited

U.S. PATENT DOCUMENTS

| 2001/0019226 A1* | 9/2001 | Ekelund | ................ H02J 1/10 307/29 |
| 2009/0167543 A1* | 7/2009 | Bi | .................... H02J 7/0047 340/636.1 |

(Continued)

FOREIGN PATENT DOCUMENTS

| JP | 2002-19112 A | 7/2002 |
| JP | 2009-140507 A | 6/2009 |

(Continued)

*Primary Examiner* — Alfonso Perez Borroto
*Assistant Examiner* — Esayas G Yeshaw
(74) *Attorney, Agent, or Firm* — Rabin & Berdo, P.C.

(57) ABSTRACT

An uninterruptible power supply, including a plurality of power supply units, a plurality of battery units and an information integration management unit. Each power supply unit belongs to one of an operating system and a standby system. Each battery unit belongs to one of a power failure standby system and a power failure backup system. The information integration management unit manages the power supply units and the battery units, by receiving an instruction from an externally connected management device, and setting each of the power supply units to be in the operating system or the standby system, and setting each of the battery units to be in the power failure standby system or the power failure backup system, in accordance with the received instruction.

10 Claims, 7 Drawing Sheets

(51) Int. Cl.
   *H02J 9/06*      (2006.01)
   *H02J 7/34*      (2006.01)
   *H04B 1/40*      (2015.01)
   *H04L 1/00*      (2006.01)
   *H04L 27/20*     (2006.01)

(56) References Cited

U.S. PATENT DOCUMENTS

| | | | |
|---|---|---|---|
| 2013/0313908 A1* | 11/2013 | Liu | H02J 1/10 307/72 |
| 2015/0180233 A1 | 6/2015 | Yamada et al. | |
| 2015/0185292 A1* | 7/2015 | Doi | G01R 31/3606 340/870.02 |
| 2015/0214768 A1* | 7/2015 | Matsuyama | G06Q 50/06 700/296 |
| 2016/0006242 A1 | 1/2016 | Yamada et al. | |
| 2016/0134145 A1* | 5/2016 | Sakuma | H02J 3/32 320/136 |

FOREIGN PATENT DOCUMENTS

| | | |
|---|---|---|
| JP | 2013-070551 A | 4/2013 |
| WO | WO-2014/141487 A1 | 9/2014 |
| WO | WO-2015/015570 A1 | 2/2015 |

\* cited by examiner

| POWER ASSISTING STARTING TIME | 12:00 | |
|---|---|---|
| POWER ASSISTING ENDING TIME | 15:00 | |
| POWER ASSISTING POWER | 700 | W |
| BATTERY CHARGING STARTING TIME | 0:00 | |

SET

| | (1) 9/22 (POWER ASSISTING ACCUMULATED TIME) | (2) 9/23 (POWER ASSISTING ACCUMULATED TIME) | (3) 9/24 (POWER ASSISTING ACCUMULATED TIME) | (4) 9/25 (POWER ASSISTING ACCUMULATED TIME) | (5) 9/26 (POWER ASSISTING ACCUMULATED TIME) | (6) 9/27 (POWER ASSISTING ACCUMULATED TIME) |
|---|---|---|---|---|---|---|
| BATTERY UNIT 1 | [100h] | [105h] | 110h | 110h | 110h | [110h] |
| BATTERY UNIT 2 | 105h | 105h | [105h] | 110h | 110h | 110h |
| BATTERY UNIT 3 | 105h | 105h | 105h | [105h] | 110h | 110h |
| BATTERY UNIT 4 | 120h | 120h | 120h | 120h | 120h | 120h |
| BATTERY UNIT 5 | 108h | 108h | 108h | 108h | [108h] | 113h |

UNINTERRUPTIBLE POWER SUPPLY AND CONTROL METHOD THERE OF

CROSS REFERENCE TO RELATED APPLICATION

This application is a continuation of the PCT application PCT/JP2016/061272, filed on Apr. 6, 2016, which is based upon and claims the benefit of priority of the prior Japanese patent application No. 2015-105912, filed on May 25, 2015, the entire contents of which are incorporated herein by reference.

BACKGROUND OF THE INVENTION

Field of the Invention

The present invention is related to an uninterruptible power supply that supplies power to an external device from a built-in battery in case of abnormality of a commercial power supply, and particularly to an uninterruptible power supply that can extend the lifetime of a built-in battery and to a control method of the uninterruptible power supply.

Description of Related Art

Usually, an uninterruptible power supply (UPS) is used by being connected between a commercial power supply and an external device (for example. an electric device such as a server, a personal computer, etc.).

An uninterruptible power supply outputs power of a commercial power supply to an external device when the commercial power supply is normal, and charges a built-in battery with power obtained from the commercial power supply.

When a power failure occurring on the commercial power supply side prevents the supply of power from a commercial power supply, the uninterruptible power supply supplies power accumulated in a built-in battery to an external device.

Also, in addition to the above measures against power failures, an uninterruptible power supply is used when peak-cut or peak-shift measures of power are taken.

In an uninterruptible power supply described in Japanese Laid-open Patent Publication No. 2009-140507 (hereinafter "JP'507"; see, e.g., FIG. 13), a configuration is employed in which a plurality of uninterruptible power supplies are connected with the same power line and power of a battery is supplied through the power line from an uninterruptible power supply having a sufficient remaining capacity to a different uninterruptible power supply having a smaller battery capacity.

Figure 1:
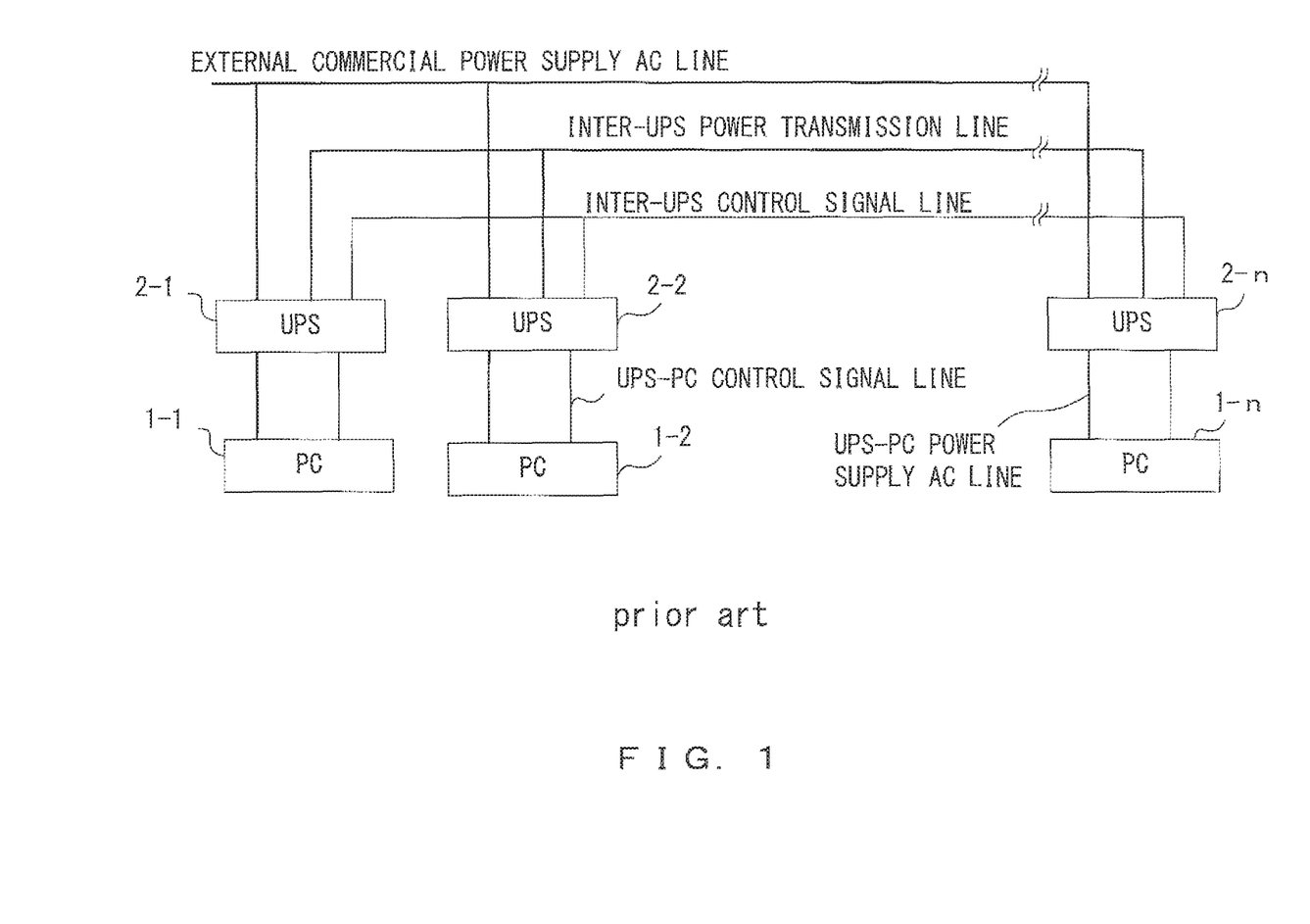
FIG. 1 shows a configuration of the uninterruptible power supply disclosed in JP'507.

FIG. 1 shows a configuration of a conventional uninterruptible power supply disclosed in JP'507. In FIG. 1, UPSs (uninterruptible power supplies) $2\text{-}1, \ldots, 2\text{-}n$ employ a configuration in which power from an AC power supply is supplied to a corresponding PC (Personal Computer) 11 so that a built-in battery is charged with power from an AC power supply when an AC power supply is normal, and power accumulated in this battery is supplied to the corresponding PC 11 in case of abnormality (power failure etc.) of an AC power supply. Also, the UPSs $2\text{-}1, \ldots, 2\text{-}n$ are connected to each other through an inter-UPS power supply line and are connected through an inter-UPS control signal line.

Explanations will be given for a case when the UPS 2-1 whose battery capacity remains sufficient supplies battery power to a different UPS $2\text{-}n$ having insufficient battery capacity. In such a case, a power transmission control unit (not shown) of the UPS 2-1 supplies its battery power to the inter-UPS power supply line. Upon this, the power transmission control unit (not shown) on the UPS $2\text{-}n$ side from among other UPSs $2\text{-}2, \ldots, 2\text{-}n$ is set to be in a state in which it can receive power on the inter-UPS power supply line, and other UPSs $2\text{-}2, \ldots, 2\text{-}n\text{-}1$, etc. are set to be in a state in which they cannot receive power on the inter-UPS power supply line. In this state, the battery power from the UPS 2-1 will be supplied only to the UPS $2\text{-}n$.

However, there has been a problem in which accommodation of power between a battery having a sufficient remaining battery capacity and a battery having an insufficient remaining battery capacity results in a situation where sufficient power cannot be supplied to an external device in case of power failures etc.

SUMMARY OF THE INVENTION

The present invention provides an uninterruptible power supply that can fully utilize charged battery power in an uninterruptible power supply that supplies battery power to an external device, and a control method of the uninterruptible power supply.

An aspect of the present invention configures a plurality of battery units by using a power failure standby system and a power failure backup system so as to be able to secure necessary backup time by outputting power of a battery unit of a power failure standby system to an external device even when a power failure has occurred in a commercial power supply.

Another aspect of the present invention is configured to extend the lifetime of a power failure backup system battery even when a battery for power assisting is operated only for a power failure backup system, by switching a power failure backup system battery to a battery of a backup system.

As described above, by configuring a battery unit built in an uninterruptible power supply by using a power failure standby system and a power failure backup system, the present invention can always secure necessary power backup time (for example 180 seconds) for external device even when a power failure has occurred in a commercial power supply.

Also, the present invention can extend the lifetime of a power failure backup system battery by switching a power failure backup system battery to a battery of a backup system even when a battery for power assisting is operated only for a power failure backup system.

Also, the present invention can equalize the battery lifetimes of respective battery units by switching a power failure backup system and a power failure standby system on the basis of backup accumulated time of a battery unit.

Also, the present invention can suppress power demand required by a power unit to a lower level by outputting power from a battery to an external device during operation peak hours and charging a battery at night-time, in which power demand has a margin.

DETAILED DESCRIPTION OF THE INVENTION

Hereinafter, explanations will be given for the embodiments of the present invention by referring to the drawings.

[First Embodiment]

Figure 2:
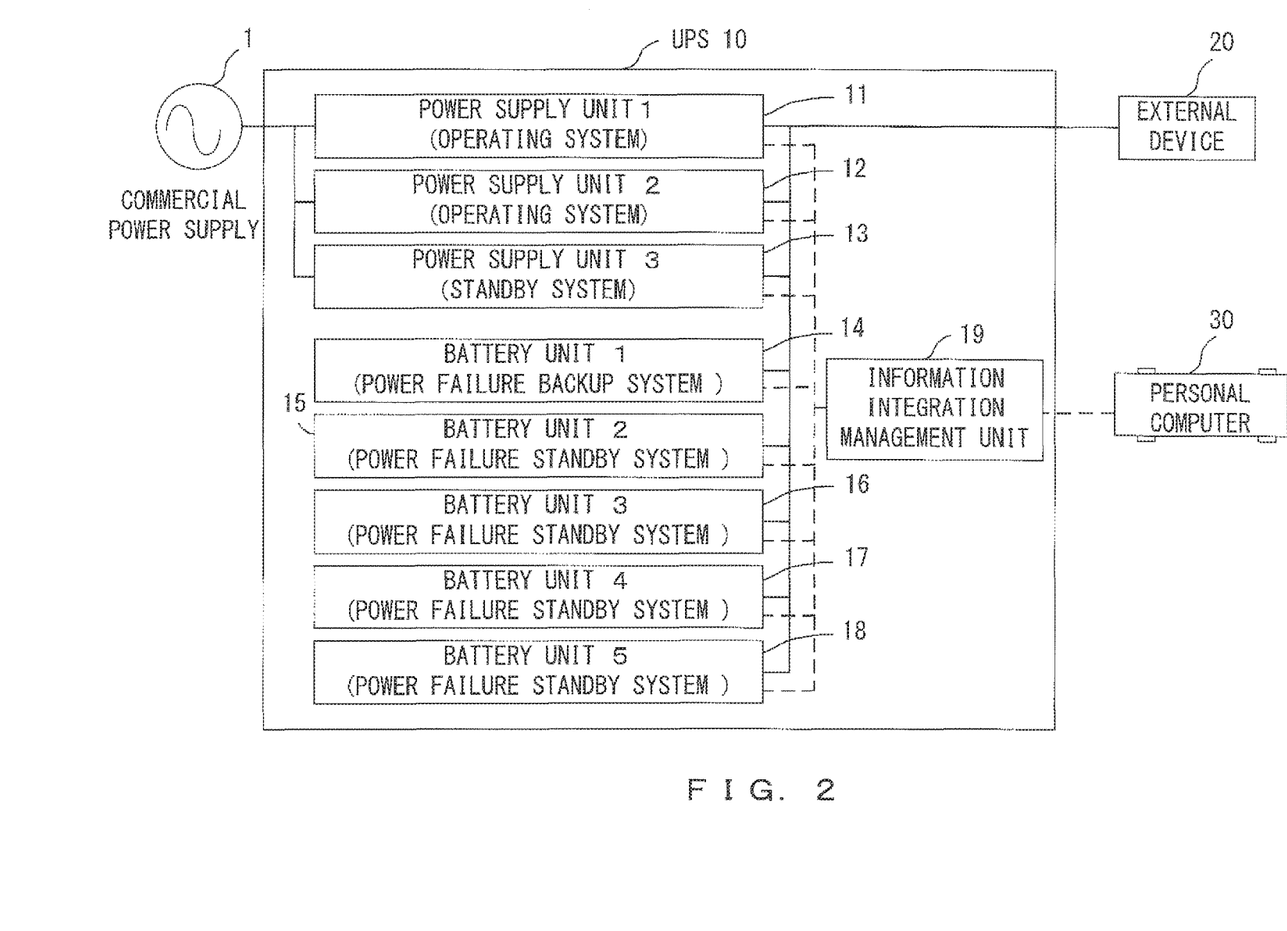
FIG. 2 is a block diagram showing a first configuration example of an uninterruptible power supply according to an embodiment of the present invention.

FIG. 2 is a block diagram showing a first configuration example of an uninterruptible power supply according to the embodiment of the present invention.

In FIG. 2, an uninterruptible power supply 10 of the embodiment of the present invention includes a plurality of power supply units (for example three power supply units 1 through 3) 11 through 13, a plurality of battery units (for example five battery units 1 through 5) 14 through 18 and one information integration management unit 19.

In this example, the power supply units (operating system) 11 and 12 normally output power of a commercial power supply 1 to an external device 20.

The power supply unit (standby system) 13 operates as a power supply unit (operating system) when a failure of one of the power supply units (operating systems) 11 and 12 has occurred.

The power supply units (operating systems) 11 and 12 charge the battery units 14 through 18 (for example battery units 1 through 5).

Also, when one of the power supply units (operating systems) 11 and 12 has failed, the power supply unit (standby system) 13 charges the battery units 14 through 18 together with a normal power supply unit in place of a failed power supply unit.

The battery units (power failure standby systems) 15 through 18 operate as battery units that output power to the external device 20 in case of occurrence of a power failure.

The battery unit (power failure backup system) 14 operates as a power supply unit (standby system) when a failure of the power supply unit (standby system) 13 has occurred.

Also, the battery unit (power failure backup system) 14 performs power assisting at a time of peak cut when the uninterruptible power supply 10 is set to be in a state in which it can perform peak cut of power.

The information integration management unit 19 is connected a personal computer (managing terminal) 30 provided externally, and controls the power supply units 11 through 13 and the battery units 14 through 18 on the basis of various settings from the personal computer 30.

Also, the personal computer (managing terminal) 30 controls the information integration management unit 19 so as to set a period of time and a power value for power assisting.

When a period of time set by the personal computer (managing terminal) 30 arrives, the information integration management unit 19 performs power assisting by using a battery of the battery unit (power failure backup system) 14.

Note that the information integration management unit 19 shown in FIG. 2 is implemented by an information processing apparatus known to those skilled in the art. For example, the information processing apparatus includes, as its hardware resources, a CPU (Central Processing Unit), a storage device (including a ROM, a RAM, an HDD), an input/output device (including a communication interface, a display device, a printer, a mouse, a keyboard, etc.), etc.

Usually, a CPU has a function of controlling the entire device, a storage device (including a ROM, a RAM and an HDD) has a function of storing data and program, and an input/output device has a function of inputting data, outputting data and communicating data with external devices.

Upon implementing the functions, they are implemented by the above CPU appropriately reading and executing a program stored in the above storage device.

Explanations will be given for power assisting performed by an uninterruptible power supply according to the embodiment of the present embodiment by referring to (1) and (2) below.

(1) When a battery unit that performs power assisting operates with a power failure standby system/power failure backup system.

When the information integration management unit 19 is set to configure the battery units 14 through 18 by a power failure standby system/power failure backup system, batteries of the power failure standby systems 15 through 18 are used for securing backup time necessary for the external device 20 (for example 180 seconds) in case of the occurrence of a power failure of the commercial power supply 1.

Further, by switching a battery unit of a power failure backup system to a battery unit of a power failure operating system that replaces a power supply unit (standby system) 3 in case of the occurrence of a power failure, backup time can be extended.

(2) When a battery unit that performs power assisting operates with a power failure backup system alone When the information integration management unit 19 is set to perform power assisting by a power failure backup system battery unit alone (the battery unit of a power failure backup system in the shown example is the battery unit 14), there is a possibility that the lifetime of the power failure backup system battery unit will be reduced.

In order to avoid this, the information integration management unit 19 stores a backup accumulated time of each battery in a storage device (see table D1 in FIG. 7) in the unit 19, reads the backup accumulated time of each battery unit stored in the storage device in the information integration management unit 19, selects a battery of a battery unit having short backup accumulated time of each battery unit as a battery for performing a power assisting so as to switch the battery unit of the selected battery to a battery unit of a power failure backup system that performs power assisting, and thereby equalizes the battery lifetimes of the respective battery units.

Figure 3:
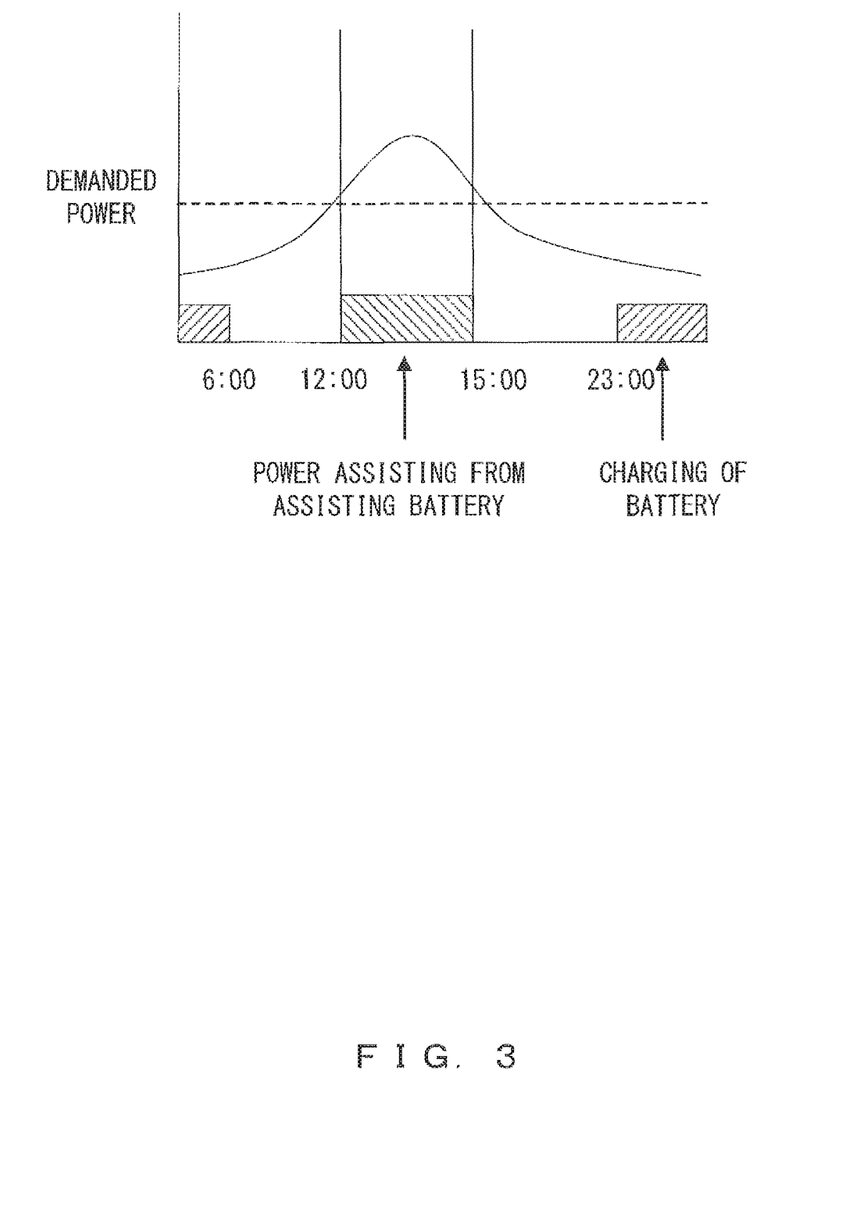
FIG. 3 shows a schematic example of a case when an uninterruptible power supply according to the embodiment of the present invention performs power peak cut.

FIG. 3 shows a schematic example of a case when a power supply unit of the embodiment of the present invention performs power peak cut.

In FIG. 2 and FIG. 3, the power supply units (operating systems) 11 and 12 of the embodiment of the present invention suppress power demand required by the power units (operating systems) 11 and 12 to a lower level by charging a battery at night-time, in which power demand has a margin, and performing power assisting by using the nighttime-charged batteries during demand peak hours.

Specifically, as shown in FIG. 2 and FIG. 3, power supply units (operating systems) 11 and 12 of the present invention charge the batteries 14 through 18 at night-time (for example from 23:00 through 6:00 of the next day), in which power demand has a margin, and use the charged batteries 14 through 18 so as to perform power assisting during peak hours of power demand (for example from 12:00 through 15:00), and thereby suppress power demand required by the power supply units (operating systems) 11 and 12 to a lower level.

Suppressing power required by the power supply units (operating systems) 11 and 12 to a lower level has an effect of reducing the $CO_2$ emission, in addition to the reduction in the power costs.

Figure 4:
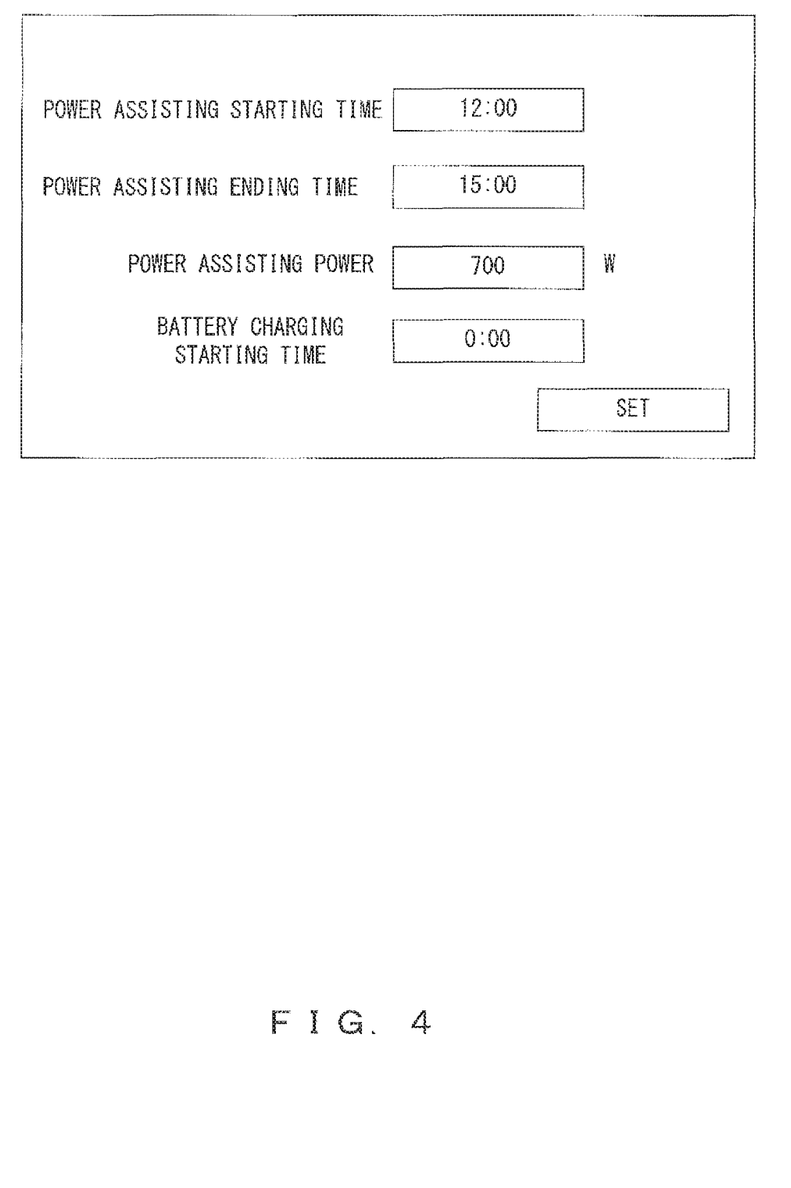
FIG. 4 shows a power assisting setting window example in an uninterruptible power supply according to the embodiment of the present invention.

FIG. 4 shows a power assisting setting window example in an uninterruptible power supply according to the embodiment of the present invention.

The power assisting setting window shown in FIG. 4 is a setting input window displayed in the window of the personal computer (managing terminal) 30 connected to the uninterruptible power supply 10 and is for performing setting of power assisting by inputting power assisting starting time (for example 12:00), power assisting ending time (for example 15:00), power assisting power (for example 700W) and battery charging starting time (for example 0:00) through the personal computer (managing terminal) 30 so as to manipulate the setting button (right lower corner of the window).

Setting information in the power assisting setting window (power assisting starting time, power assisting ending time, power assisting power and battery charging starting time) is transmitted to the information integration management unit 19 via a network so as to be set in a storage device (not shown) of the information integration management unit 19.

When the power assisting starting time (for example 12:00) arrives, the information integration management unit 19 performs control so that assist power (for example 700W) is output from the battery unit 1 (power failure backup system) 14 on the basis of the set information.

When the power assisting ending time (for example 15:00) arrives, the information integration management unit 19 performs control so that the supply of power assisting power (for example 700W) from the battery unit 1 (power failure backup system) 14 stops.

When the battery charging starting time (for example 0:00) arrives, the information integration management unit 19 performs control so that charging of the battery unit 1 (power failure backup system) 14 etc. starts on the basis of the set information.

[Second Embodiment]

Figure 5:
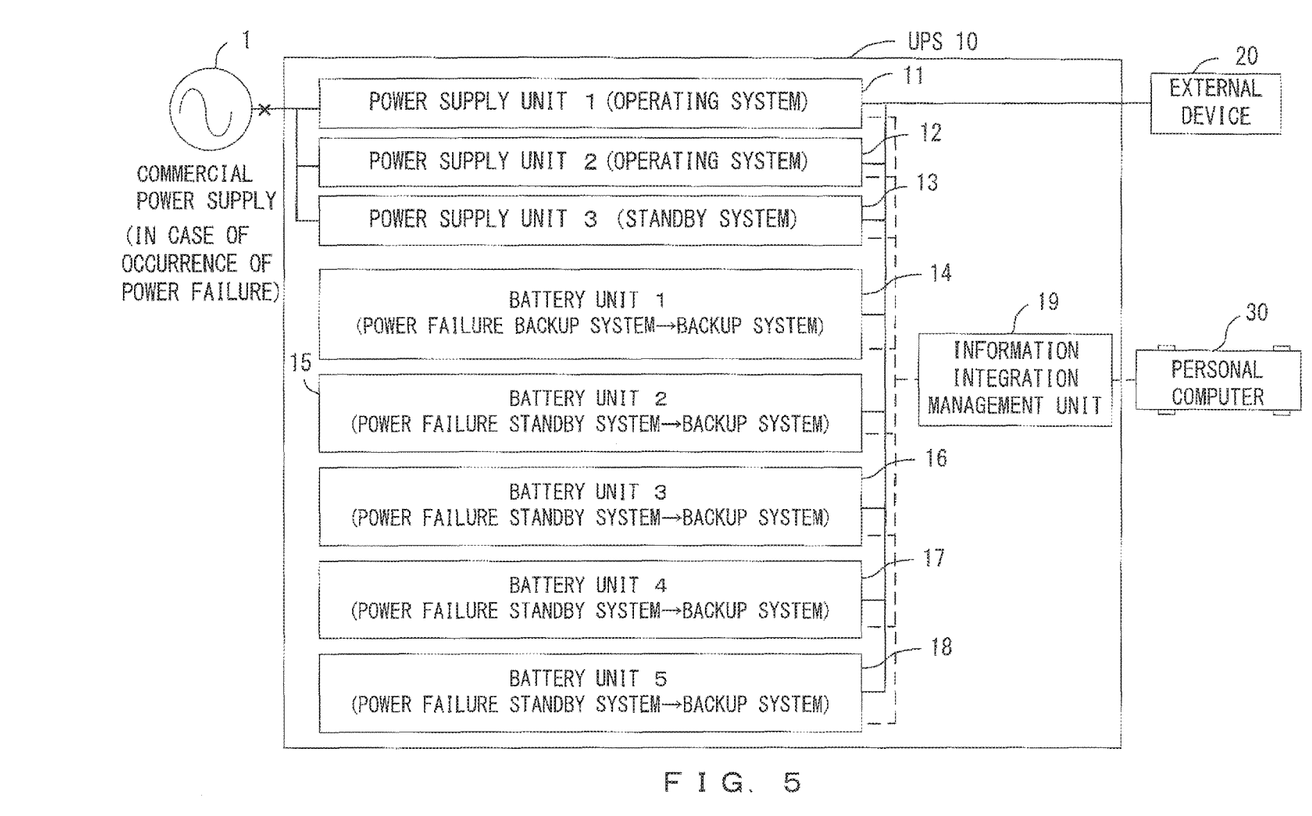
FIG. 5 is a block diagram showing a second configuration example of an uninterruptible power supply according to the embodiment of the present invention.

FIG. 5 is a block diagram showing a second configuration example of an uninterruptible power supply according to the embodiment of the present invention.

The second configuration example of the uninterruptible power supply shown in FIG. 5 is different from the first configuration example of the uninterruptible power supply described above and shown in FIG. 2 is that in order to equalize the battery lifetimes of the battery units (for example battery units 1 through 5) 14 through 15, in case of the occurrence of a power failure, a power failure backup system and a power failure standby system are switched to be used so that an extension of battery lifetimes of the battery units 14 through 18 is possible in comparison to a case when switched use is not performed.

Specifically, when a power failure occurs on the commercial power supply 1 side (as denoted by a cross in the shown example) in FIG. 5, the extension of backup time is made possible by switching a battery unit that is operating as a power failure backup system (battery unit 1 in the shown example) to one of the battery units 15 through 18 of a backup system for a power failure standby purpose.

In the shown example, while a power failure backup system is operating as the battery unit 1, by switching a battery that performs power assisting to for example the battery unit 2 etc. on the basis of backup accumulated time of each battery unit, it is possible to make an attempt to equalize the battery lifetimes of respective battery units.

Figure 6:
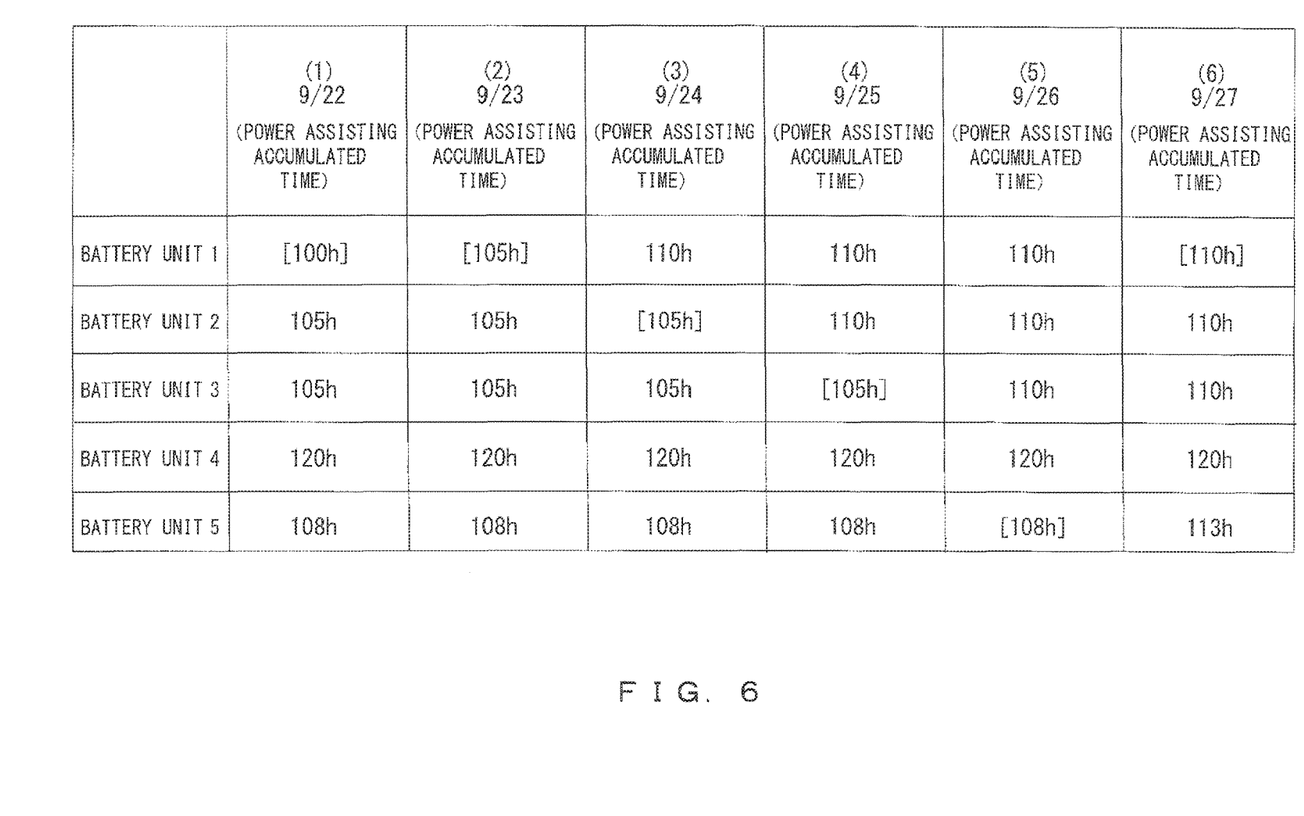
FIG. 6 shows a selection example of a battery unit that performs power assisting according to the embodiment of the present invention.

FIG. 6 shows a selection example of a battery unit that performs power assisting according to the embodiment of the present invention, and shows an example of a case when power assisting of 5 hours per day is performed.

Figure 7:
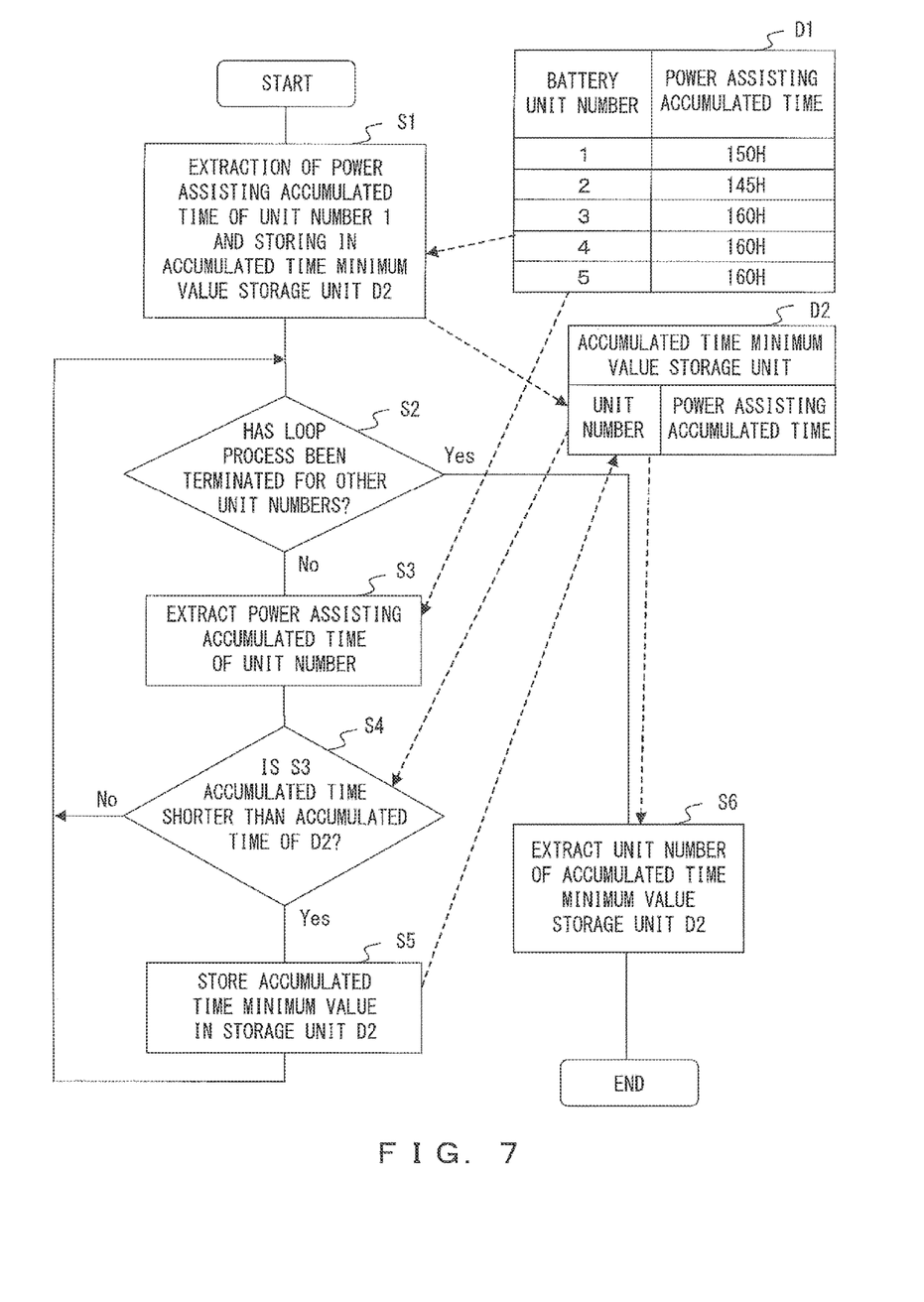
FIG. 7 shows a selection process flow of a battery unit that performs power assisting according to the embodiment of the present invention.

In FIG. 6, each number having a slash on the upper row shows a date, and [ ·· h] shows an example of selecting a battery unit that performs power assisting on the basis of power assisting accumulated time. Specific explanations for FIG. 6 are as below:

(1) On September 22, because the accumulated time of battery unit 1 is the minimum, the battery unit 1 is selected
(2) On September 23, because the accumulated time of battery unit 1 is the minimum and the unit number is smaller than those having the same accumulated time, the battery unit 1 is selected
(3) On September 24, because the accumulated time of battery unit 2 is the minimum and the unit number is smaller than those having the same accumulated time, the battery unit 2 is selected
(4) On September 25, because the accumulated time of battery unit 3 is the minimum, the battery unit 3 is selected
(5) On September 26, because the accumulated time of battery unit 5 is the minimum, the battery unit 5 is selected
(6) On September 27, because the accumulated time of battery unit 1 is the minimum and the unit number is smaller than those having the same accumulated time, the battery unit 1 is selected FIG. 7 shows a selection process flow of a battery unit that performs power assisting according to the embodiment of the present invention.

In the selection process flow of FIG. 7, the information integration management unit 19 stores power assisting accumulated time of each battery unit in a storage device (not shown) in the information integration management unit 19 (specifically, a record of table D1 in the upper right portion of FIG. 7). This example shows an example in which 5 battery units are prepared, however the scope is not limited to this example.

When power assisting starting time arrives, the information integration management unit 19 extracts power assisting accumulated time stored in the record with battery unit number 1 from table D1 and stores the unit number and the power assisting accumulated time in a record of accumulated time minimum value storage unit D2 provided in a storage device (not shown) in the information integration management unit 19 (step S1 and table D2).

For other battery unit numbers, the information integration management unit 19 performs a loop process that is similar to those performed for battery unit number 1 so as to determine whether or not loop processes have been terminated for all the other battery unit numbers (step S2).

When loop processes for all the other battery unit numbers have not been terminated (step S2=NO), the information integration management unit 19 extracts the power assisting accumulated time having the corresponding battery unit number from the record of table D1 in the upper right portion of FIG. 7.

When it is smaller than a value stored in a record of accumulated time minimum value storage unit D2 in comparison with power assisting accumulated time stored in a record of accumulated time minimum value storage unit D2 executed by step S1 above(step S4=YES), the information integration management unit 19 stores the unit number and the power assisting accumulated time in the storage unit D2 so as to update them.

When it is greater than power assisting accumulated time stored in a record of accumulated time minimum value storage unit D2 (step S4=NO), the process returns to step S2.

When loop processes for all the other battery unit numbers in step S2 have been terminated (step S2=YES), the information integration management unit 19 extracts a unit number stored in accumulated time minimum value storage unit D2.

The information integration management unit 19 selects a battery unit having thus extracted unit number as a battery unit for performing power assisting.

INDUSTRIAL APPLICABILITY

The present invention is not limited to a UPS (uninterruptible power supply) having a commercial power supply as power supply but can also be applied to other supply devices that do not use a commercial power supply as power supply.

What is claimed is:

1. An uninterruptible power supply (UPS) that supplies battery power to an external device, comprising:
a plurality of power supply units, each belonging to one of an operating system and a standby system;
a plurality of battery units each having a battery, each battery unit belonging to one of a power failure standby system and a power failure backup system; and
an information integration management unit for managing the power supply units and the battery units, the information integration management unit including
a processor, and
a non-transitory storage medium having program instructions stored therein, execution of the program instructions by the processor causing the information integration management unit to perform steps of
receiving an instruction from an externally-connected management device,
setting each of the power supply units to be in the operating system or the standby system, and setting each of the battery units to be in the power failure standby system or the power failure backup system, in accordance with the received instruction,
controlling the battery unit in the power failure backup system so that the battery unit supplies power to the external device during a first period of time when the received instruction includes the first period of time for supplying power from the battery unit in the power failure backup system to the external device, and
controlling the power supply unit so that the battery unit supplies power to both the external device and the batteries in the battery units during a second period of time that is different from the first period of time.

2. The UPS according to claim 1, wherein
the UPS has an external device connected thereto; and
the information integration management unit is configured to set the first period of time and a power value for performing power assisting for the external device based on the instruction,
start the power assisting and supply power to the external device at a starting time of the set first period of time, and
stop the power assisting and the power supply to the external device at an ending time of the set first period of time.

3. The UPS according to claim 1, wherein
the information integration management unit is configured to use the batteries to secure a backup time for the external device at an occurrence of a power failure.

4. The UPS according to claim 3, wherein
the information integration management unit supplies backup power to the external device from the batteries at the occurrence of the power failure.

5. The UPS according to claim 1, wherein
the information integration management unit stores a backup time of each of the battery units, and
upon determining that the received instruction is an instruction to perform power assisting using a power failure backup system battery unit alone, the information integration management unit
refers to the stored backup times of the battery units to select one of the battery units that has a shortest backup time and a smallest unit number to be the power failure backup system battery unit, and
performs the power assisting using a battery of the selected power failure backup system battery unit.

6. A control method of an uninterruptible power supply (UPS) that supplies battery power to an external device, the UPS including
a plurality of power supply units, each belonging to one of an operating system and a standby system, and
a plurality of battery units each having a battery, each battery unit belonging to one of a power failure standby system and a power failure backup system,
the method comprising:
receiving an instruction from an externally-connected management device, the instruction containing information as to whether each of the plurality of power supply units belongs to the operating system or the standby system, and information as to whether each of the plurality of battery units belongs to the power failure standby system or the power failure backup system;
setting each of power supply units to be in one of the operating system and the standby system in accordance with the received instruction, to thereby manage the power supply units;
setting each of battery units to be in one of the power failure standby system and the power failure backup system in accordance with the received instruction, to thereby manage the battery units;
controlling the battery unit in the power failure backup system so that the battery unit supplies power to the external device during a first period of time when the received instruction includes the first period of time for supplying power from the battery unit in the power failure backup system to the external device, and
controlling the power supply unit so that the battery unit supplies power to both the external device and the batteries in the battery units during a second period of time that is different from the first period of time.

7. The control method of a UPS according to claim 6, further comprising:

setting the first period of time and a power value for performing power assisting for the external device, based on the received instruction, starting the power assisting and supplying power to the external device at a starting time of the set first period of time, and stopping the power assisting and the power supply to the external device at an ending time of the set first period of time.

8. The control method of a UPS according to claim 6, wherein the control method further includes using the batteries to secure a backup time for the external device at an occurrence of a power failure.

9. The control method of a UPS according to claim 8, further comprising:

selecting one of the battery units in the UPS to be a power failure backup system battery unit; and supplying backup power to the external device from the battery of the selected power failure backup system battery unit at the occurrence of the power failure.

10. The control method of a UPS according to claim 6, the method comprising:

storing a backup time of each of the battery units;

upon determining that the received instruction is an instruction to perform power assisting using a power failure backup system battery unit alone, referring to the stored backup times to select one of the battery units that has a shortest backup time and a smallest unit number to be the power failure backup system battery unit; and performing the power assisting using the battery of the selected power failure backup system battery unit.

* * * * *